United States Patent [19]

van der Kuur

[11] Patent Number: 4,848,161
[45] Date of Patent: Jul. 18, 1989

[54] EXTENSOMETER

[75] Inventor: John van der Kuur, Pembroke, Ontario, Canada

[73] Assignee: Atomic Energy of Canada Limited, Ottawa, Canada

[21] Appl. No.: 197,166

[22] Filed: May 23, 1988

Related U.S. Application Data

[63] Continuation-in-part of Ser. No. 42,664, Apr. 27, 1987, Pat. No.

[30] Foreign Application Priority Data

Dec. 22, 1986 [CA] Canada ................................ 526053

[51] Int. Cl.[4] .......................... G01N 3/00; G01B 5/00
[52] U.S. Cl. ...................................... 73/760; 33/501.6
[58] Field of Search ............ 33/143 L, 147 D, 147 L, 33/147 M, 148 D, 148 H, 149 J; 73/763, 769, 773, 780, 781, 787, 826, 831, 856, 860, 760

[56] References Cited

U.S. PATENT DOCUMENTS

| 2,578,066 | 12/1951 | Hyde | 33/148 D |
| 2,821,784 | 2/1958 | Huyser | 33/148 D |
| 3,140,601 | 7/1964 | Weyland et al. | 73/780 |
| 3,190,007 | 6/1965 | Nicola et al. | 33/147 D |
| 3,776,030 | 12/1977 | Strimel | 33/143 L |
| 4,507,871 | 4/1985 | Meyer et al. | 33/148 D |

FOREIGN PATENT DOCUMENTS 0123750 7/1985 Japan ..................................... 73/760

Primary Examiner—Stewart J. Levy
Assistant Examiner—Robert R. Raevis
Attorney, Agent, or Firm—Ronald G. Bitner

[57] ABSTRACT

A simple extensometer that allows remote sensing under harsh testing conditions, such as elevated temperatures. The apparatus uses two extension arms arranged such that there is no contact between the two linkages connecting the specimen to a strain measuring device, thereby avoiding friction, the major source of problems, namely high hysteresis and non-linearity.

8 Claims, 1 Drawing Sheet

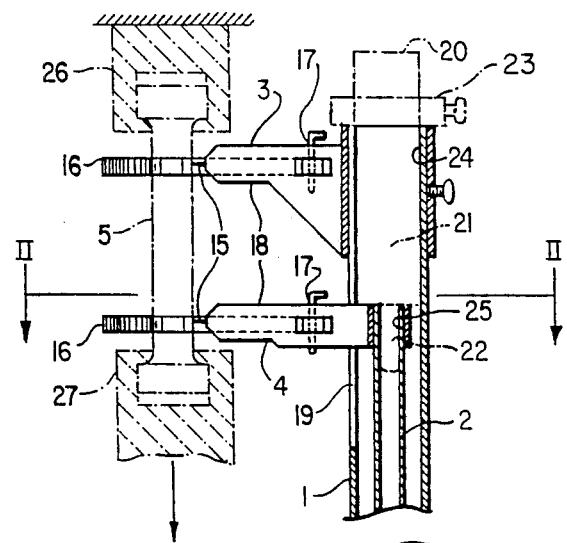
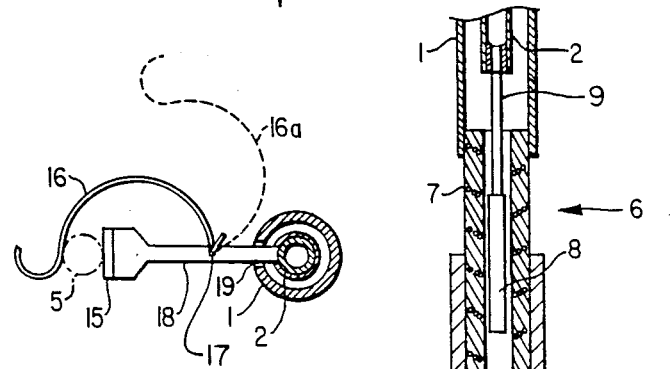
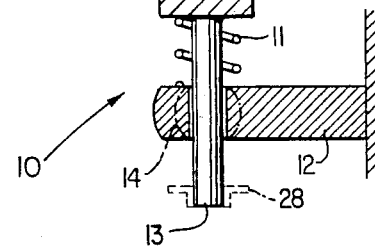
FIG. 2
FIG. 1

EXTENSOMETER

This is a continuation-in-part application of Ser. No. 042,664 filed Apr. 27, 1987, now abandoned.

FIELD OF THE INVENTION

This invention relates to an extensometer, and particularly to an extensometer that allows remote sensing under harsh testing conditions, such as elevated temperature.

BACKGROUND OF THE INVENTION

The measurement of strain at elevated temperatures has previously involved one of two basic approaches, namely placing the sensing unit in the heated zone or transferring the specimen strain outside the heated zone to a sensing element at or near room temperature.

Problems encountered with having the sensing unit in the heated zone are; linearity/repeatability loss due to temperature effects on the sensing unit and complexities of cooling the sensing unit.

Prior devices using the alternate approach of transferring the strain mechanically outside the heated zone tend to be complex and include frictionally contacting components which contribute to hysteresis and non-linearity.

Most of the present extensometers have complex mechanisms for attachment to the specimen.

SUMMARY OF THE INVENTION

An object of the present invention is to provide a simple device for transferring specimen strain outside a harsh testing region.

The present invention provides an extensometer comprising: first and second substantially parallel longitudinally extending arms; specimen clamping means attached to one end portion of each arm, the clamping means of one arm being longitudinally spaced a predetermined distance from the other for clamping a specimen the longitudinal axis of which is disposed substantially parallel to the arms; a strain measuring device comprising a locating body portion and sensing portion wherein the other end portion of said first arm is attached to the body portion and the other end of the said second arm is attached to the sensing element whereby the sensing device senses relative longitudinal motion between the arms; and support means for resiliently supporting the weight of the extensometer and laterally confining the lower portion of the first arm to maintain the longitudinal axis thereof substantially parallel with the longitudinal axis of the specimen while allowing movements along the longitudinal axis.

DESCRIPTION OF THE DRAWINGS

FIG. 1 is a schematic representation of an embodiment of the invention.

FIG. 2 is a section of the apparatus shown in FIG. 1 taken at II—II.

DESCRIPTION OF PREFERRED EMBODIMENT

Referring to FIGS. 1 and 2, the extensometer comprises a pair of longitudinally extending arms 1 and 2. Attached to one end of each arm are specimen clamps 3 and 4 arranged to clamp a specimen 5 so that its longitudinal axis lies substantially parallel to that of the arm 1 and 2. Attached to the opposite end of each arm is the strain measuring device 6. Arm 1 is attached to the body portion 7 of the measuring device, while arm 2 is attached to sensing element 8. The arms 1 and 2 are laterally spaced from one another with sufficient clearance to avoid frictional contact with one another.

The strain measuring device is shown in the form of a linear variable differential transformer (LVDT) in which the core 8 defines the sensing element which is connected to arm 2 by an interconnecting link 9. Another suitable measuring device is a super linear variable capacitance transducer (SLVC). Either an LVDT or SLVC have a geometry that is convenient for the present invention.

The extensometer is supported by resilient support means 10 that includes a readily compressible spring 11 mounted on a fixed supporting member 12.

It can be seen that the extensometer is supported at the body portion 7 of the strain measuring device which in turn is connected to arm 1.

The support means 10 laterally confines the lower element 13 affixed to arm 1 to maintain the longitudinal axis of the arms substantially parallel to the longitudinal axis of the specimen 5.

The support means 10 permits sliding of the lower portion 13 of the extensometer along the longitudinal axis of the arm 1. The support means will also preferably be provided with pivot means 14 to allow the extensometer to be moved for sample changing.

It may also be preferable to provide means for preventing rotation, about the verticla axis, of the lower extensometer portion 13 relative to the support arm 12. This may be desirable to prevent the possibility of the specimen clamp 3 to "walk" around a cylindrical specimen. The means for this may be conveniently provided by using, for the sliding means referred to above, a linear bearing of the type that prevents rotation. Alternatively, the spring 11 may be used to prevent rotation, about the vertical axis, of the extensometer relative to the support member by having the ends frictionally engaged or locked with the respective member.

Each of the specimen clamps 3 and 4 as shown comprises a knife edge portion 15 and a resilient retaining member 16 connected by pivot means 17 to bracket 18 which is attached to one arm 1 or 2.

In the embodiment as shown in FIG. 1, the upper portion of specimen 5 is fixed by means of a specimen grip 26 of the tensile testing machine (not shown), while the lower portion of specimen 5 is pulled downwardly by means of specimen grip 27.

It will be appreciated that the above arrangement can be reversed, whereby the upper bracket 3 (attached to outer arm 1) is positioned below the other bracket 4 in which case the lower specimen grip would be fixed while the upper end of the specimen would be pulled upwardly.

The apparatus includes a removable alignment device 20 used while attaching the extensometer to the specimen. The alignment device 20 comprises locating portions 21 and 22 of different diameters for insertion into the top portions, 24 and 25, of the arms 1 and 2, respectively, to maintain them in spaced coaxial relation and also to position arm 2 longitudinally (vertically), along with clamp 4, relative to arm 1, along with clamp 3, to establish the desired gauge length, that is, the spacing between the knife edges 15. Preferably, the alignment device 20 will include an adjustable stop member 23, in the form of a collar with means for fastening to the upper portion of the alignment device 20, to facilitate adjustment of gauge length setting. The alignment device 20 may be provided with readily releasable securing means such as a bayonet type of connector.

In operation, with reference to FIG. 1, prior to attachment of the specimen, the alignment device 20 is positioned as shown with the larger diameter portion 21 sliding into the upper opening 24 of arm 1. Locating portion 22 slides into the upper opening 25 of arm 2 whereby the larger diameter portion 21 abuts against the arm 2. The position at which stop member 23 is secured to the alignment device 20 establishes the position of the specimen clamp 3 relative to clamp 4, and hence sets the gauge length when the alignment device is fully inserted. The alignment device also provides that the two arms are concentrically spaced at the start of the test to avoid contacting one another during the subsequent testing operation.

The specimen is clamped in place by pivoting the resilient retaining members 16 from the open position (16a) to the locked position 16 which secures the specimen against the knife-edges 15.

When the clamps are secured to the specimen the alignment device 22 is removed.

During the testing, with extension of the specimen taking place, the slight longitudinal (vertical) movement of arm 1, due to displacement of the upper portion of the specimen along with specimen clamp 3, is accommodated by the spring 11 and sliding of lower portion 13 relative to the supporting arm 12.

It can be seen that the arrangement provides that there is no frictional engagement between the linkage (arm 2) that interconnects the sensing element 8 and the specimen clamp 4 and the linkage (arm 1) that interconnects the body portion 7 of the strain measuring device and the other specimen clamp 3. By eliminating the requirement for contact between the two linkages, the problems and complexities in construction of previous devices in order to reduce friction and the resulting hysteresis are avoided.

The arms will preferably be constructed of a lightweight material to minimize the weight of the suspended device. The outer arm 1 will preferably have openings that provide vents for uniform temperature of the inner and outer arms, and reduced mass to allow temperature equilibrium to be established rapidly.

Although the embodiment shown in the drawings shows tubular coaxial, concentrically arranged arms, it will be understood that a similar device can be constructed with non-coaxial or substantially parallel arms.

It will be understood that the device, as shown in FIG. 1 may be inverted, that is, the extensometer assembly would be suspended from, rather than supported on, a suitable support member (12). In this case the outer end of the extensometer 13 would be provided with a retaining element 28 and the spring (11) would be placed between the retaining elements and supporting member (12) such that the extensometer is resiliently suspended.

I claim:

1. An extensometer system comprising an extensometer and support structure for the extensometer;
    said extensometer comprising first and second substantially paralel longitudinally extending arms; specimen clamping means attached to one end portion of each arm, the clamping means of one arm being longitudinally spaced a predetermined distance from the other for clamping a specimen the longitudinal axis of which is disposed substantially parallel to the arms, and a strain measuring device comprising a locating body portion and a sensing element wherein the other end portion of said first arm is attached to the body portion and the other end portion of the said second arm is attached to the sensing element whereby the sensing element indicates relative longitudinal motion between the arms;
    said supporting structure comprising a support member, a resilient member disposed on the support member for resiliently supporting the weight of the extensometer; and
    said body portion of the extensometer including a lower portion and said support member including receiving means for slidably receiving and laterally confining said lower portion of the body portion to maintain the longitudinal axis of the extensometer substantially parallel with the longitudinal axis of the specimen while allowing movement along the longitudinal axis.

2. The extensometer system of claim 1, further comprising removable alignment means for aligning the upper portions of the arms longitudinally and laterally relative to one another prior to testing.

3. The extensometer system of claim 1 wherein one of the arms is tubular and disposed about the other arm, and whereby the first and second arms are spaced from one another, a distance sufficient to prevent frictional contact with one another.

4. The extensometer system of claim 3 wherein one arm is disposed coaxially with the other arm.

5. The extensometer system of claim 1 wherein the strain measuring device is defined by a linear variable differential transformer (LVDT).

6. The extensometer system of claim 1 wherein the support member includes pivot means allowing pivoting of the extensometer relative to the support structure about a horizontal axis in a horizontal plane passing through said support member.

7. The extensometer system of claim 1, further comprising means for preventing rotation about a longitudinal vertical axis of the body portion of the extensometer relative to the support means.

8. The extensometer system of claim 1 wherein the specimen clamping means comprises a bracket attached to the corresponding arm, a knife-edge portion attached to the bracket, a resilient retaining member pivotably attached to the bracket for releasably retaining the specimen against the knife-edge.

* * * * *